A. M. WOLF.
AUTOMOTIVE VEHICLE.
APPLICATION FILED DEC. 8, 1919.

1,424,867.

Patented Aug. 8, 1922.
4 SHEETS—SHEET 4.

WITNESSES:
Arthur M. Hart
Harry L. Brady

INVENTOR.
Austin M. Wolf
BY
Arthur L. Kent
his ATTORNEY

UNITED STATES PATENT OFFICE.

AUSTIN M. WOLF, OF PLAINFIELD, NEW JERSEY.

AUTOMOTIVE VEHICLE.

1,424,867.  Specification of Letters Patent.  Patented Aug. 8, 1922.

Application filed December 8, 1919. Serial No. 343,155.

*To all whom it may concern:*

Be it known that I, AUSTIN M. WOLF, a citizen of the United States, residing at Plainfield, in the county of Union and State of New Jersey, have invented certain new and useful Improvements in Automotive Vehicles, fully described and represented in the following specification and the accompanying drawings, forming a part of the same.

This invention relates to improvements in automotive vehicles, and has for an object to provide such a vehicle of simple construction which may be made very light, and may be economically built.

A further object of my invention is to provide a form of drive in which there shall be a very slight loss of power due to friction.

A further object of my invention is to provide a spring suspension which will more effectively protect a vehicle from all road shock than has been accomplished heretofore.

Other objects and advantages of my invention will be explained in connection with the detailed description of the specific embodiment of my invention which is shown in the accompanying drawings, in which:—

While the various features of my invention may beneficially be used separately, in the preferred form, I incorporate them in a single unitary structure shown in the drawings. This structure is an automobile chassis having a rigid frame upon which an engine is mounted at an acute angle to the longitudinal axis of the vehicle. Direct driving connection is provided between the engine and one of the rear wheels. The other rear wheel is driven by the rear wheel driven by the engine, through a yieldable connection. Each of the wheels is mounted so that with its mounting it forms a separate unit. The chassis frame is supported on the middle portions of normally flat transverse springs which connect the wheel units.

Figure 1:
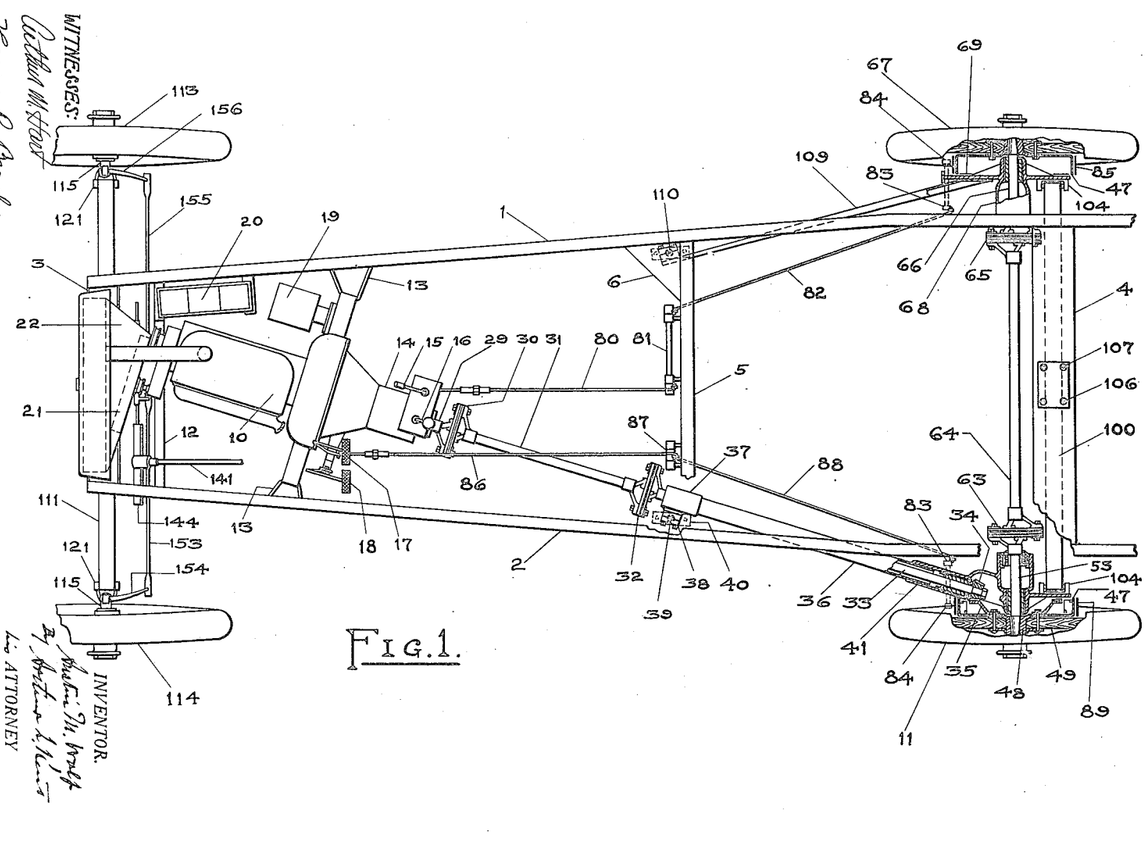
Fig. 1 is a plan view of the chassis, showing portions of the rear wheel units broken away.
Figure 2:
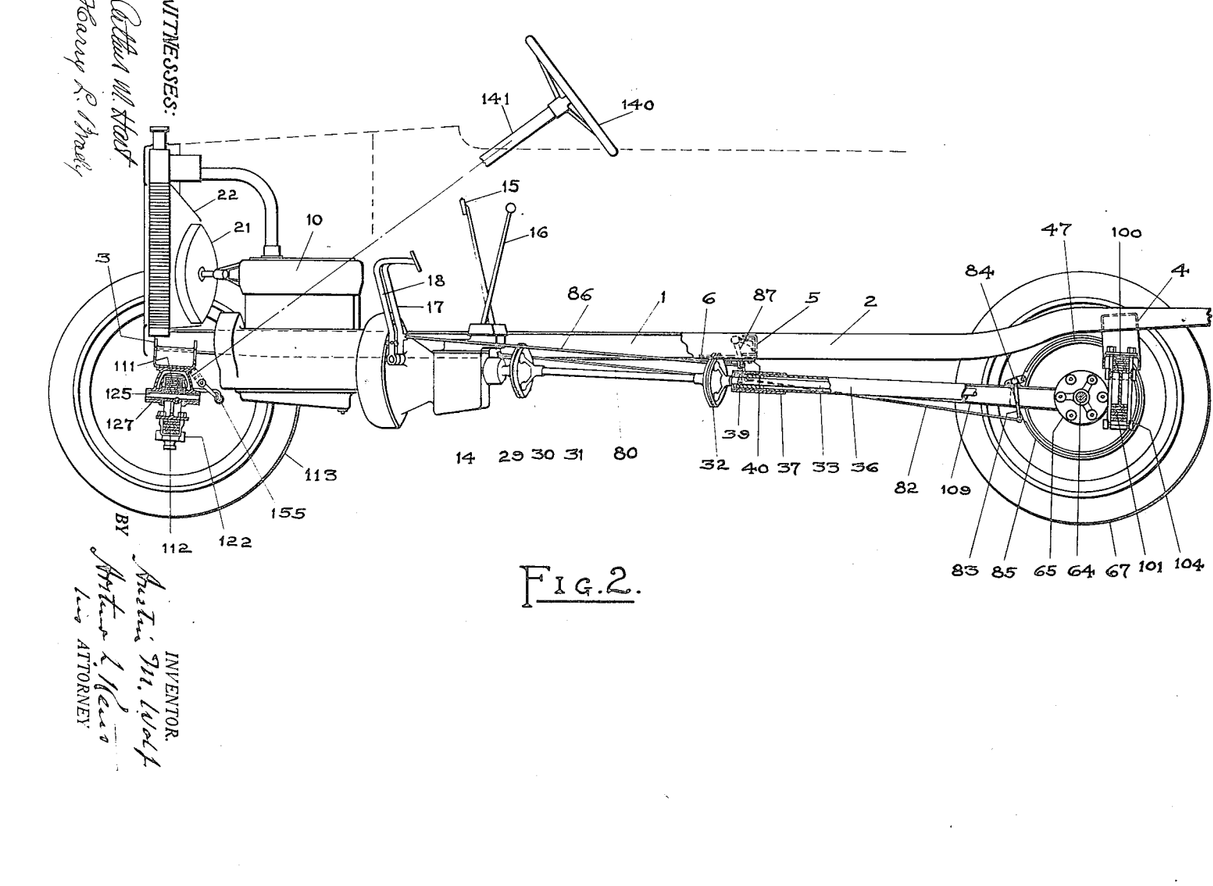
Fig. 2 is a side elevation of the chassis partly in section.

*Chassis frame.*—Figs. 1 and 2 show the chassis frame, which consists of a right-hand side rail 1 and a left-hand side rail 2 united at their front ends by the cross member 3, and at their back ends by the cross member 4. An intermediate cross member 5 is attached to the side rails 1, 2. A gusset plate 6 is attached to the side rail 1 and intermediate member 5, and a similar gusset plate is provided at the connection of the transverse member 5 with the side rail 2. The front ends of the side rails 1 and 2 are tapered so that the cross member 3 is tipped forward slightly as shown in Fig. 2. The purpose of this is hereinafter explained in connection with the front spring suspension.

*Power plant mounting.*—The engine 10 is mounted with its shaft at an acute angle with the longitudinal axis of the chassis frame in order that it may transmit power directly to the rear wheel 11. The engine has the three-point type of suspension in the chassis frame, being supported at its forward end by the cross bar 12 and its rear end by the hangers 13. The transmission 14 is bolted to the housing of the engine 10, thus forming a unit power plant. The transmission is provided with the usual operating levers—an emergency brake lever 15, and a gear shift lever 16, and with the usual pedals—a brake pedal 17, and a clutch pedal 18.

The engine is located with its center of gravity on the longitudinal axis of the vehicle. The weight of the transmission 14, which is to the left of the longitudinal axis, is counterbalanced by that of the starting motor 19 and the battery 20. The center of gravity of the entire power plant unit is thus upon the longitudinal axis of the vehicle, so that the static balance is preserved.

The fact that the engine is not in line with the longitudinal axis of the vehicle causes no inconvenience in driving. With the vehicle arranged for a left-hand drive, as shown, the operation of the brake lever 15 and the gear shift lever 16 is more convenient than in the ordinary construction, as it is easier to make a movement with the arm at an angle than it is to reach out and pull or push a lever directly forward or backward. The brake pedal 17 and the clutch pedal 18 are mounted upon the clutch shaft, which is perpendicular to the engine shaft and, therefore, at an angle with a cross line of the vehicle. In the arrangement illustrated, a movement of either pedal through an arc of three inches causes a side movement of but ⅜ of an inch, which is too small to cause any inconvenience to the operator; and if the driver sits in the corner of the seat, the operation of the pedals in the inclined position is more convenient than if they were in the ordinary position, as the push of the foot and leg can be in a direct line with the stroke of the pedal.

Owing to the angular position of the engine, the fan 21 which is mounted upon a shaft parallel to the engine shaft, so that it may be driven by an ordinary belt from the engine shaft is out of line with the radiator. To enable the fan to draw an adequate volume of air through the radiator, a shroud 22 is provided extending from the radiator to the periphery of the fan.

*Driving connection.*—The transmission shaft 29 is connected by universal joint 30 to the intermediate shaft 31 which connects through the unversal joint 32 to the propeller shaft 33. The left rear wheel 11 is driven by the propeller shaft through the engagement of a bevel pinion 34 mounted on the propeller shaft with the internal bevelled gear 35 on the wheel.

A casing 36 surrounds a propeller shaft 33 and is held at its forward end in a casting 37. This casting is supported from the chassis frame by a universal joint which is formed by two blocks 38 bolted to the casting 37 and having a spherical cavity between them which forms a socket for the ball 39, which is supported from the bracket 40. The bracket 40 is bolted to the gusset plate like the plate 6 and to the cross member 5.

Figure 8:
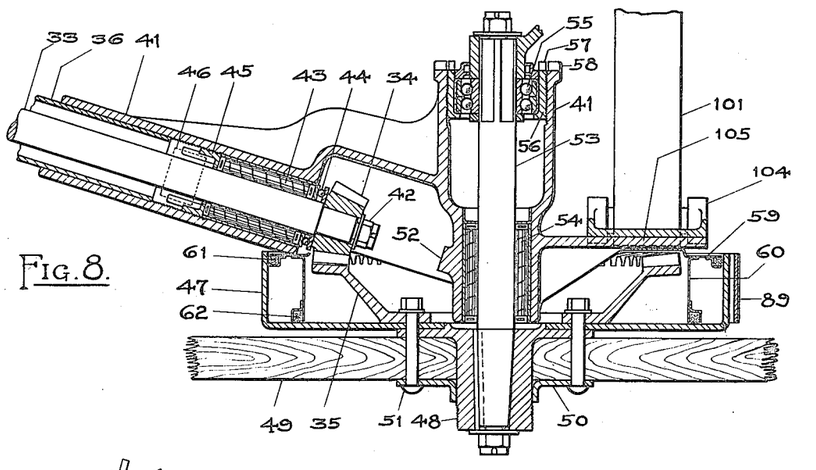
Fig. 8 is a detail plan view of the left rear wheel unit, sectioned on the axle of the rear wheel.

The rear end of the casing 36 enters and is securely fastened to the casting 41, upon which the left rear wheel is mounted. On the rear end of the propeller shaft 33 is mounted the bevelled pinion 34 held in place by a nut 42. The rear end of the shaft 33, is mounted in the casing 41 by means of the roller bearing 43 and the ball thrust bearing 44. A similar roller bearing supports the front end of the propeller shaft within the casting 37. In order to provide for longitudinal adjustment of the bevelled pinion 34, a threaded collar 45 is placed in abutment with the outer face of the roller bearing 43. An opening 46 in the top of the casting 41 gives access to the threaded collar 45. The collar has projections or fins on its outside by which it may be turned by an instrument inserted through the opening 46. The cap which fits over the opening 46 has a projecting finger which enters between two of the fins of the collar 45, thus holding it against rotation.

The bevelled gear 35 lies inside the brake drum 47 and is bolted to the rear wheel hub 48. The spokes 49 of the wheel are clamped between the hub 48 and the flange 50 by means of the bolts 51 which thus unite the bevelled gear, the brake drum, the hub, the flange and the spokes.

The gear 35 is made in the form of an internal bevelled gear in order to provide for a reduction ratio of 5 to 1 between the pinion 34 and the gear 35. If a ratio is as small as 3½ to 1 the gear 35 becomes a crown gear, but in order to use a high engine speed, it is preferable to make the reduction greater than this. Although it is usually necessary, therefore, to make the gear 35 an internal bevelled gear, this gear is easy to manufacture, as the pitch cone angle is not greatly in excess of 90°.

Considerable space is provided between the toothed portion of the gear 35 and side of the brake drum 47. By the use of this space, a change in the gear ratio may easily be made if desired. It is merely necessary to substitute for the pinion 34 a pinion with more teeth and of greater diameter, and for the gear 35 a gear of the same diameter as the gear 35, but having its toothed portion back nearer the side of the brake drum.

A boss 52 is formed on the inner surface of the casting 41 opposite the end of the propeller shaft 33. By the aid of this boss, the pinion 34 may be removed from the shaft without the use of a gear-pulley. In order to do this a block is placed between the nut 42 and the boss 52. A collar or wedge is placed between the pinion 34 and the portion of the casting 41 through which the shaft enters. The nut 42 is then turned outwardly so as to brace it against the block.

This forces the propeller shaft back through its casing and releases the pinion 34.

The hub 48 of the left rear wheel is mounted on a stub shaft 53 which is supported within the casting 41 by means of the roller bearing 54 and the ball bearing 55. The latter is mounted in a cage 56 which is threaded in the casting 41. This allows axial adjustment of the stub shaft 53, which serves to adjust the position of the gear 35 in relation to the pinion 34. The cage 56 is provided with fins 57. Fins 58 are provided at the edge of the casting 41. When the proper adjustment of the cage 56 has been attained, a finger, not shown, is inserted between the fins 57 and 58 to retain the cage in position.

A closure is provided for the chamber formed by the casting 41 and the brake drum 47 in order that grease or oil may be retained in this chamber to lubricate the gears. This closure consists of a plate 59 attached to the casting 41, and a band 60 attached to the plate 59. Packings 61, 62, held by the plate 59 and the band 60 respectively, serve to prevent the lubricant from leaking out between the rotating drum 47 and the closure. The use of spaced packings eliminates any danger of leakage; for should the packing 62 leak to any extent, the annular space between the two packings will become filled with grease which will form what is commonly known as a grease packing, effectively preventing the further escape of grease from the gear chamber, or the entrance of dirt or moisture from without.

The inner end of the stub shaft 53 is connected through the universal joint 63 of the flexible disc type to the intermediate shaft 64. The other end of the intermediate shaft is connected through a similar universal joint 65 in the inner end of the stub shaft 66, upon which the right rear wheel 67 is mounted. As the discs of the type of universal joint shown are resilient as well as flexible, the joint permits a rotative yield against an increasing resistance.

The right rear wheel unit is similar to the left rear wheel unit, except that in the right rear wheel unit there are no gears. The stub shaft 66 of the right rear wheel is mounted within the casting 68 in the same way in which the stub shaft 53 is mounted in the casting 41, except that no means are provided for the longitudinal adjustment of the stub shaft 66. As no lubricant is contained in the chamber formed by the casting 68 and the brake drum 47 of the right wheel unit, a tight closure for this chamber is not provided. A plate 69 excludes dust from the chamber.

I find it an advantage in a light car of this type to drive one of the rear wheels directly from the other without the use of a differential. When a differential is used, a wheel which is in the air after striking a road obstacle is spun at a increased speed, which causes wearing of the tire when the wheel again strikes the ground. This does not occur in my drive. As no differential is used, there is, of course, a certain amount of slippage necessary in turning the corners, but I find that the wear on the tires caused by this slippage is less than that caused by the speeding up of the tires when free from the ground which occurs when a differential is used. Furthermore, the rotative yield against an increasing resistance provided by the flexible disc universal joints 63 and 65 has a cushioning effect preventing a sudden slip of one wheel in turning corners, and reduces somewhat the amount of slip necessary to get around the corner.

*Brakes.*—The vehicle is provided with two brakes, a foot brake and an emergency brake, which are entirely independent. Each brake acts to retard one of the rear wheels directly, and to retard the other through the connection between the rear wheel stub shafts. The emergency brake lever 15 connected through a rod 80 to a lever on the cross shaft 81. Another lever upon the shaft 81 is connected to the rod 82, which is connected to a lever 83 upon a small shaft which bears a lever 84, which actuates the brake band 85 in the usual way, and serves to draw it tight around the brake drum of the right rear wheel when the lever 12 is operated. The brake pedal 17 is connected through the rod 86, the lever 87, and rod 88 to operate the brake band 89 of the left rear wheel in a similar manner.

*Spring suspension.*—The wheels of the vehicle together with their mountings form separate units having no rigid connection with each other or with the chassis frame. The two rear wheel units are united by normally flat parallel transverse springs, and the two front wheel units are united by similar parallel transverse springs. The chassis frame is supported from the middle portion of the two sets of springs.

The springs attached to the rear wheel units are best shown in Figs. 1, 2, 7 and 8. The two parallel springs 100, 101 are provided at their ends with the usual eyes by means of which they are attached to the casting 41 of the left rear wheel unit by spring bolts 102 and 103, passing through brackets 104 mounted on the rearwardly projecting arm 105 of the casting 41. The space between the brackets 104 is slightly larger than the width of the springs 100, 101 (see Fig. 8) so as to permit a slight forward or backward movement of the wheel unit relative to the spring for the purpose hereinafter explained. The other ends of the springs 100, 101 are similarly attached to the casting 68 of the right rear wheel unit. The springs are attached at their center to the cross member 4 of the chassis frame by spring clips 106, 107. A spacer block 108 keeps its springs at proper distance from each other.

Figures 3, 4, 5, 6, 7:
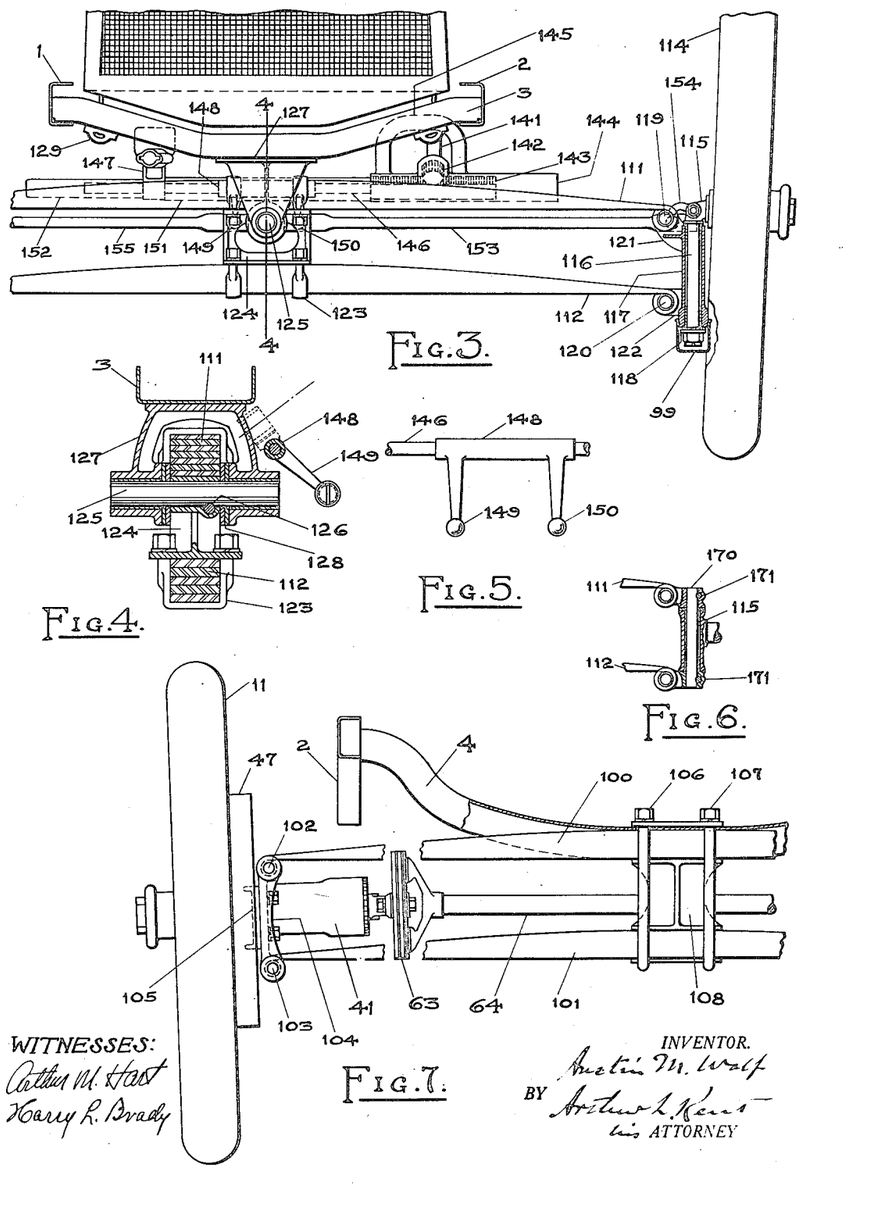
Fig. 3 is an enlarged front elevation of the chassis, showing a part of the front wheel unit in section.
Fig. 4 is a transverse section on the line 4—4 of Fig. 3, showing the way in which the front springs are connected to the chassis frame.
Fig. 5 is a detail view of the transversely movable steering member.
Fig. 6 is a front sectional elevation of a modified form of the front wheel unit.
Fig. 7 is a rear elevation of the chassis.

The cross member 4 of the chassis frame has a cam surface against which the flat spring 100 contacts when the spring is depressed under load. This cam surface is so arranged that it will allow entire freedom of spring action under ordinary deflection. When, however, the deflection exceeds the normal amount, the spring 100 comes in contact with the cam surface of the cross member 4 to a greater and greater extent as the deflection increases. The effect is to stiffen the spring 100 in the case of particularly heavy shocks. This graduated increase in resistance gives the spring desirable riding qualities.

The springs are preferably attached in such a way as to give a slight camber to the rear wheels. This may be done by making the spring 100 slightly longer than the spring 101, as shown in the drawings, or by a difference in length in the upper and lower ears of the bracket 104. The universal joints 63 and 65 permit a camber without interrupting the drive between the wheels. This camber of the rear wheels makes the car hold the road much better than a car in which the rear wheels are parallel.

The springs 100 and 101 hold the rear wheel units in the proper position in a vertical plane. The left rear wheel unit is prevented from turning in a horizontal plane by its attachment to the chassis frame through the casing 36 attached to the frame by the universal joint 39. To prevent horizontal turning of the right rear wheel unit, a brace 109 is provided. This brace is attached with its rear end to the casting 68 of the right rear wheel unit, and is mounted at its front end on the universal joint 110 on the chassis frame. The casing 36 and the brace 109 serve also to take the torque reaction of the wheel units, due to the driving torque applied to the rear wheels by the driving gears. As each rear wheel unit is rigidly attached to a universal joint upon the chassis frame, their up and down motion under the influence of road obstacles and spring deflection is in an arc whose center is at the universal joint. Their up and down motion is, therefore, combined with a slight forward and backward motion relative to the chassis frame. The play allowed between the spring brackets 104 and the springs 100, 101 permits this motion. The use of normally flat springs renders the side motion of the rear wheel under spring deflection negligible.

The front wheels also constitute with their mountings separate units which are attached to the chassis frame by the parallel normally flat springs 111, 112.

Each of the front wheels 113, 114 is mounted on a spindle 115 in the customary way. The spindle 115 has a downward extension 116 which is mounted in a barrel 117. Bearing washers 118 are placed in the barrel 117 below the downward extension 116 of the wheel spindle to carry the weight of the vehicle. A cap 99 encloses the lower end of the barrel in order to retain lubricant therein.

The ends of the springs 111 and 112 are in the form of eyes which are attached to the barrels 117 by spring bolts 119, 120, passing through ears 121, 122. The desired camber is given the front wheels by making the angle between the horizontal portion of each front wheel spindle 115 and the depending portion of the spindle less than 90°. If this angle is made 90°, the camber may be given the front wheels in the same way as described in connection with the camber of the rear wheels.

The central portion of the springs are bound together by spring clips 123 which retain the frame 124 between the springs. In the frame 124 is mounted the longitudinal pivot 125 (Fig. 4) which is held against rotation in the frame 124 by the pin 126. On the pivot 125 is mounted a bracket 127 which is attached to the front cross member 3 of the chassis frame. Bearing washers 128 upon the pivot 125 take the side thrusts of the chassis frame upon the frame 124. As the cross member 3 is slightly tipped forward the bracket 127 which is fastened to it is also tipped forward. This results in throwing the pivot 125 and the springs 111 and 112 slightly out of the vertical plane, so that the lower ends of the barrels 117 are slightly in advance of their upper ends. This tip in the members on which the front wheel spindles are pivoted, results in what is called a caster action, making the front wheels track properly.

It will be seen that especially long front springs are provided by the system described. These springs are flat under normal load in order to minimize the side movement of the wheels under spring deflection. The pivotal mounting of the chassis frame upon the springs results in a greater efficiency of the spring action as the entire spring functions as a cantilever spring. Thus when one of the front wheels is raised by a road obstruction, the portions of the springs on each side of the pivot are compressed so that the resiliency of the entire spring is utilized, although only one of the wheels is raised. To limit the spring deflection or the pivotal motion of the springs about the chassis frame, rubber bumpers 129 are provided on the front cross member 3 of the chassis frame.

In the case of both the front and rear springs, the upper and lower springs have a different number of leaves. The object of this is to give the two springs of each set a different normal period of vibration, thereby eliminating the excessive vibration caused by resonance, which occurs when a single spring or a pair of springs of the same vibration period is used and road irregularities corresponding with the normal period of the vibration of the spring or springs are encountered.

*Steering gear.*—The steering gear is arranged so as not to interfere with an independent motion of the two front wheel units. As seen in Fig. 1, the steering wheel 140 is secured to the steering shaft 141, which is rotatably mounted on the chassis frame in the usual way, and has at its lower end a pinion 142. This pinion 142 meshes with a rack 143 which is transversely movable within the housing 144, which is supported from the front cross member 3 of the chassis frame by the bracket 145. From one end of the rack 143 extends a rod 146 which is slidably supported at its other end in the bracket 147. On this rod is mounted a sleeve 148 which has depending from it two balls 149 and 150. A dust cap 151 extends between the housing 144 and the bracket 147, and consists of a circular piece of metal with a slot through which extend the arms of the sleeve 148, which carry the balls 149 and 150. A dust cap 152 is provided on the outer side of the bracket 147 to exclude dirt from the extending portion of the rod 146. The balls 149 and 150 are located on opposite sides of the pivot 125 and quite near this pivot. A rod 153 connects the ball 150 to a steering knuckle 154 upon the left front wheel spindle 115, and a separate and similar rod 155 connects the ball 150 to the steering knuckle 156 of the right front wheel unit.

In steering, a horizontal turning movement is imparted to the front wheel units by the transverse movement of the balls 149 and 150 caused by a transverse movement of the rack 143 under the action of the steering wheel. As the balls 149 and 150 are centrally located, deflection of the springs 111 and 112 causes no horizontal turning of the front wheels. Furthermore, as these balls are close to the pivot 125, a turning of the front springs upon this pivot causes no material horizontal turning of the front wheel units.

Many changes may be made in the specific automobile chassis described without departing from my invention, and some of my improvements may be used without using the others, if desired.

While I shall make no attempt to catalogue all the changes which may be made in the specific construction without departing from my invention, I will mention some of them.

The static balance of the power plant may be preserved without placing the center of gravity of the engine on the longitudinal axis of the chassis. If it is found convenient to place the center of gravity of the engine at one side of the axis, the weight of the engine may be balanced by the weight of the transmission, the starting motor, the battery, the gasolene tank, or other power plant auxiliaries, so that the center of gravity of the entire power plant, including all the auxiliaries, is on the center line of the chassis.

It is not necessary that the two springs of each pair have a different number of leaves. A different period of vibration may be given to them in any desired way.

The braking mechanism may be modified by the use of a transmission brake. If a transmission brake is used, the brake band upon one of the rear wheels may be done away with.

The fan 21 may, if desired, be supported upon a shaft perpendicular to the radiator and driven from the engine by a cross belt or other suitable driving mechanism. In this case, the shroud 22 may be dispensed with.

Other forms of universal joints may be substituted for the flexible disc universal joints 30, 32, 63 and 65. If desired, a single universal joint may be used between the engine and the left rear wheel, to take the place of the two universal joints 30 and 32. In this case the single universal joint would be located in the same position as the universal joint 30 in the structure illustrated, and the casing 36 would be extended forward to this universal joint, and pivotally supported in the chassis frame near it.

Any mechanical means for giving a transverse movement to the balls 111 and 112 under the action of the steering wheel may be substituted for the pinion 142 and the rack 143.

In Fig. 6 is shown a modified construction of the front wheel pivot. In this form, the inner end of the front wheel spindle 115 takes the form of a sleeve through which extends a bearing rod 170, upon the opposite ends of which are secured the members 171 having ears for the attachment of the springs 111 and 112.

Figure 9:
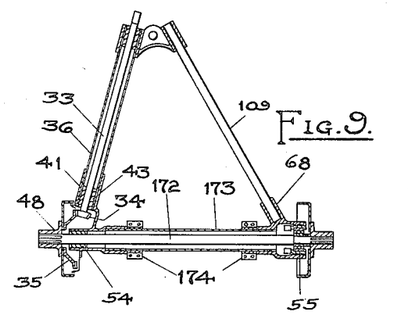
Fig. 9 is a sectional top view of a modified rear wheel unit with driving connections.

Fig. 9 shows a modification in which a single continuous rear axle 172 takes the place of the stub shafts 53 and 66 and the intermediate shaft 64; and the universal joints 63 and 65 are done away with. The housings 41 and 68 of the left and right rear wheel units respectively are united by a tube 173. If desired, this tube may be provided with spring pads 174 for attachment to the ordinary type of fore and aft springs.

Figure 10:
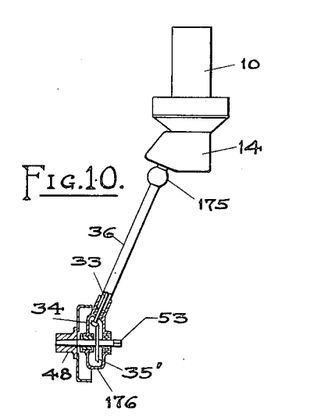
Fig. 10 is a diagrammatic top view showing a modified form of drive in which the engine is placed in line with the longitudinal axis of the vehicle, and also a modified arrangement of the driving gears and their enclosure.

Fig. 10 shows a modification in which the engine 10 is placed in line with the longitudinal axis of the vehicle. In this modification the transmission 14 contains a set of bevelled gears by means of which the motion of the transmission shaft is applied to the propeller shaft 33. On the transmission case is a spherical casing 175, in or upon which the propeller shaft casing 36 is mounted so as to form a universal joint for this casing.

Fig. 10 shows also a modification of the driving gears connecting the propeller shaft with the stub shaft of one of the rear wheels, and a modification of the casing enclosing the gears. In the arrangement shown in Fig. 10 the pinion 34 upon the end of the propeller shaft is placed outside of the bevelled gear 35' mounted on the stub shaft. In this arrangement gear 35' is an ordinary bevelled gear and not an internal bevelled gear as the gear 35 in the preferred form. A closed casing 176 is provided for the protection of the gears. The stub shaft 53 is mounted in the spaced bearings upon the opposite sides of the casing 176.

The use of a pair of bevelled gears between the transmission shaft and the propeller shaft results in turning the propeller shaft in the opposite direction from that in which it would turn if driven directly as shown in the preferred form. The use of the driving gear arrangement shown in Fig. 10 results in a reversal of the direction of turning between the propeller shaft and the stub shaft which does not occur when an internal bevelled gear is used, as in the preferred form. As the result of these two reversals of turning direction in the modification shown in Fig. 10, the rear wheel is driven in the proper direction. If, however, either of the modifications shown in Fig. 10, that is to say, use of bevelled gears between the engine and the propeller shaft, or the use of an ordinary bevelled gear instead of an internal bevelled gear upon the stub shaft, be used separately, a reversal in driving direction will result which will necessitate placing the driving connection between the engine and the right rear wheel instead of driving the left rear wheel, as shown in the preferred form and in Fig. 10.

Figures 11, 12, 13:
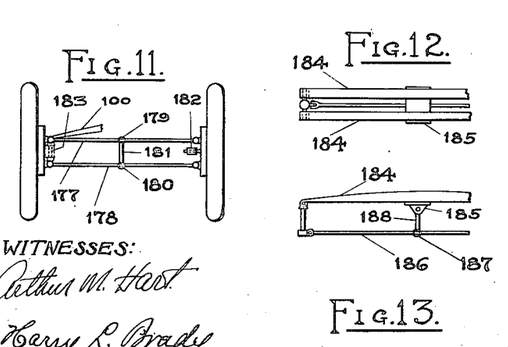
Fig. 11 is an elevation of connected wheel units, showing a modification of the spring construction.
Fig. 12 is a fragmentary plan view showing a modified spring construction.
Fig. 13 is an elevation of the modified form of spring construction shown in Fig. 12.

Fig. 11 shows a modification of the parallel members which hold opposite wheel units in vertical alignment. This modification may be applied to either the front or the rear wheels. In it the parallel members consist of rods 177 and 178 connecting the wheel units. These rods are preferably jointed at their centers 179 and 180 and connected together by a rigid member 181 at these points. By this means, the two portions of the rods on each side of the joint are kept parallel with each other when one of the rear wheels is raised independently of the other, so that the proper relation of the wheels in a vertical plane is retained.

In connection with these rods a single transverse spring 100 may be used, and may be attached to the wheel units by an extension of the bolts by which the upper rod 177 is attached to these units, or if desired, fore and aft springs may be attached to the wheel units, as shown at 182.

If desired, the rear wheel units may be mounted on vertical spindles 183. This is desirable in case the propeller shaft casing 36 or the brace 109 are pivoted to the chassis frame near the rear wheels.

In Figs. 12 and 13 a different modified spring construction is shown. In this case two parallel springs 184 are located side by side. Each spring is attached at its end to one of the wheel units, and the chassis frame is supported by a frame 185 attached to each of the springs at its middle point. A rod 186 connects the wheel units below the springs. If the chassis frame is pivotally mounted upon the frame 185 it is desirable that the rod 186 be jointed at its middle 187 and that the joint be connected by a rigid member with the rigid member 188. This modification can be applied to either the front or rear wheels.

Figure 14:
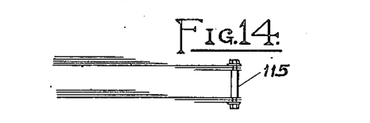
Fig. 14 is a fragmentary elevation showing a different modification of the spring construction.

Fig. 14 shows a different modification of the front springs. In this construction, the principal leaf of the parallel springs is attached directly to the front wheel spindle 115 without the use of spring eyes. In order to prevent breakage of the main spring leaf, short supplementary leaves are attached to the wheel spindle under the main leaf, as shown. This modification may also be applied to the rear wheel units.

What is claimed is:

1. An automotive vehicle, comprising a chassis frame, an engine placed with its shaft at an angle with the longitudinal axis of the chassis, a propeller shaft connecting said engine shaft with one of the rear wheels and lying in line with said engine shaft, and a direct power transmitting connection between said rear wheel and the other rear wheel.

2. An automotive vehicle having a chassis frame, a power plant supported by said chassis frame and including an engine with its shaft at an angle to the longitudinal axis of the chassis and power plant auxiliaries so located that the center of gravity of the entire power plant is at a point on the longitudinal axis of the chassis, a propeller shaft connecting said engine shaft with one of the rear wheels and lying substantially in line with said engine shaft, and a direct power transmitting connection between said rear wheel and the other rear wheel.

3. In an automotive vehicle having a chassis frame and an engine supported thereon, the combination of a pair of driving wheels symmetrically located with respect to the axis of said chassis frame so as to support substantially equal parts of the weight of the vehicle, a permanent direct power transmitting connection between said driving wheels, and a direct power transmitting connection between the engine and one of the driving wheels independent of the connection between the wheels.

4. In an automatic vehicle, a direct power transmitting connection between the engine and one of the rear wheels, and a yielding power transmitting connection between said rear wheel and the other rear wheel adapted to permit a limited relative rotative movement of the wheels.

5. In an automotive vehicle, a pair of driving wheels and a direct connection between said wheels including a resilient element permitting a rotative yield against an increasing resistance, and means adapted to transmit power to one of said rear wheels through said resilient element.

6. In an automotive vehicle, a propeller shaft driven by the engine and arranged at an acute angle to the longitudinal axis of the vehicle, a gear on said propeller shaft, and a gear directly and rigidly secured to one of the rear wheels meshing with said gear, and a direct power transmitting connection between said rear wheel and the other rear wheel.

7. In an automotive vehicle, a casing, a propeller shaft extending into said casing, a pinion mounted on said propeller shaft within said casing, a nut on the end of said propeller shaft, and a boss on the interior of said casing opposite said nut, whereby said pinion may be forced off said shaft by placing a block between said boss and said nut and turning said nut so as to push the shaft outwardly from the casing.

8. An automotive vehicle having an engine, rear wheels mounted upon separate units, parallel members one above the other connecting said rear wheel units, two braces placed at an acute angle to the longitudinal axis of the vehicle, each attached to one of said rear wheel units and pivotally attached to the chassis frame, a flexible driving connection between said engine and one of the rear wheels, and a flexible driving connection between said rear wheel and the other rear wheel.

9. An automotive vehicle having a chassis frame, an engine mounted thereon, rear wheels mounted upon separate units, two normally flat springs connecting said units and attached to the chassis frame near their middle points, braces connecting each of said units to the chassis frame, a flexible driving connection between the engine and one of the rear wheels, and a flexible driving connection between said rear wheel and the other rear wheel.

10. An automotive vehicle having a chassis frame, an engine mounted thereon, rear wheels mounted upon separate members, two normally flat springs connecting said members and attached to the chassis frame at their middle points, obliquely arranged braces each attached to one of said members and pivotally attached to the chassis frame, a flexible driving connection between said engine and one of the rear wheels, and a flexible driving connection between said rear wheel and the other rear wheel.

11. In an automotive vehicle, separate rear wheel units, a transverse spring connecting said rear wheel units to the chassis frame, means on one of said wheel units for transmitting a driving torque to one of said wheels, and a brace connecting said rear wheel unit to the chassis frame and arranged to hold said rear wheel unit against the torque reaction of said wheels upon said unit.

12. In an automotive vehicle, separate independently movable rear wheel units, resilient means connecting each of said units with the chassis frame and serving to hold the rear wheels in proper position in relation to the chassis frame, means on one of said units for transmitting a driving torque to one of said rear wheels, and a brace extending between said rear wheel unit and the chassis frame and arranged to hold said wheel upon said unit against the torque reaction of the wheels upon the units.

13. An automotive vehicle having a chassis frame, an engine mounted thereon, rear wheels mounted upon separate units, a separate brace attached to each of said units and pivotally attached to the chassis frame, a transverse spring connecting said units with the chassis frame and attached so as to permit a longitudinal movement of the units relative to the chassis frame, a flexible driving connection between the engine and one of said rear wheels, and a flexible driving connection between said rear wheel and the other rear wheel.

14. In an automotive vehicle, rear wheels having stub shafts mounted on separate members, parallel normally flat springs connecting said members and supporting the chassis frame, and an intermediate shaft between the rear wheel stub shafts connected to them by universal joints.

15. In an automotive vehicle, separate rear wheel units connected to the chassis frame by springs, and a driving connection independent of the chassis frame connecting said rear wheel units.

16. In an automotive vehicle, separate rear wheel units, a spring having its ends connected to said rear wheel units and its center connected to the chassis frame, and a flexible driving connection independent of the chassis frame connecting said rear wheel units.

17. In an automotive vehicle, rear wheels mounted upon separate members, a spring having its ends connected to said members and its center connected to the chassis frame, and a flexible connection adapted to transmit power from one rear wheel to the other and including a universal joint adjacent to each rear wheel.

18. In an automotive vehicle, rear wheels, stub shafts upon which said driving wheels are mounted, separate members in which said stub shafts are rotatably mounted, a spring having its ends connected to said members and its center connected to the chassis frame, and a flexible power transmitting connection from one rear wheel to the other and comprising universal joints on said stub shafts adjacent to said rear wheels and an intermediate shaft connecting said universal joints.

19. In an automotive vehicle, rear wheels having a camber, a direct driving connection between the engine and one of said rear wheels, and a direct flexible power transmitting connection between said rear wheel and the other rear wheel.

20. In an automotive vehicle, rear wheels having a fixed camber, independent of the load on the vehicle, and a direct flexible power transmitting connection connecting said rear wheels.

21. In an automotive vehicle, a pair of driving wheels, and a direct connection between said rear wheels including a resilient element permitting a relative rotative movement of the wheels against an increasing resistance.

22. In an automotive vehicle, a pair of driving wheels, and a direct connection between said wheels including a universal joint having a resilient element permitting a relative rotative movement of the wheels against an increasing resistance.

23. In an automotive vehicle, a pair of driving wheels, and a connection between said wheels, including a stub shaft on which each rear wheel is mounted, a universal joint on each stub shaft, and an intermediate shaft extending between said universal joints.

24. In an automobile vehicle, a pair of driving wheels, and a connection between said wheels, comprising a universal joint permitting a rotative yield against an increasing resistance adjacent to each wheel and a connection between said universal joints.

25. An automotive vehicle having a chassis frame, separate rear wheel units, an oblique propeller shaft casing extending from one rear wheel unit to a universal joint upon the chassis frame, a propeller shaft within said casing adapted to drive one rear wheel, an oblique brace extending from the other rear wheel unit to a universal joint on the chassis frame.

26. In an automotive vehicle, rear wheels mounted upon separate members, parallel elements connecting said members, an obliquely arranged propeller shaft casing connecting one of said members to a universal joint on the chassis frame, a propeller shaft within said casing adapted to drive one rear wheel, a driving connection between said rear wheel and the other rear wheel, and an obliquely arranged brace connecting the member on which the latter rear wheel is mounted to a universal joint upon the chassis frame.

27. In an automotive vehicle, rear wheels mounted upon separate members, a spring connecting said members and attached to the chassis frame, an obliquely arranged propeller shaft adapted to drive one of said rear wheels, a yielding driving connection between said rear wheel and the other rear wheel, a propeller shaft casing connecting the member on which one rear wheel is mounted with a universal joint upon the chassis frame, an obliquely arranged brace connecting the member on which the other rear wheel is mounted in a universal joint upon the chassis frame.

28. In an automotive vehicle, rear wheels mounted upon separate members, a spring connecting said members and attached to the chassis frame, an obliquely arranged propeller shaft adapted to drive one of said rear wheels, a driving connection between said rear wheel and the other rear wheel, including an axially yielding universal joint, a propeller shaft casing connecting the member on which one rear wheel is mounted to a universal joint upon the chassis frame, and an obliquely arranged brace connecting the member on which the other rear wheel is mounted to a universal joint upon the chassis frame.

29. In an automotive vehicle, rear wheels mounted upon separate members, springs connecting said members to the chassis frame, a driving connection between the engine and one of the rear wheels, and a power transmitting connection between the rear wheels, including a universal joint having a resilient element permitting a limited relative rotative movement of the wheels.

30. In an automotive vehicle, a pair of driving wheels, a direct connection between said wheels including a resilient element permitting a limited relative rotative movement of the wheels, and a brake adapted to retard one of the wheels.

In testimony whereof I have hereunto set my hand in the presence of two subscribing witnesses.

AUSTIN M. WOLF.

Witnesses:
ROBERT W. BYERLY,
ETHEL JOHNES.

Certificate of Correction.

It is hereby certified that in Letters Patent No. 1,424,867, granted August 8, 1922, upon the application of Austin M. Wolf, of Plainfield, New Jersey, for an improvement in "Automotive Vehicles", errors appear in the printed specification requiring correction as follows: Page 2, line 124, for the compound word "gear-pulley" read *gear-puller;* page 7, line 8, claim 4, for the word "automatic" read *automotive*, and line 84, claim 11, for "wheels" read *wheel;* same page, claim 12, strike out present lines 95 and 96 and insert instead *rear wheel unit against the torque reaction of said wheel upon said unit;* page 8, line 7, claim 18, for the word "driving" read *rear*, and line 30, claim 21, for the word "rear" read *driving;* same page, line 46, claim 24, for "automobile" read *automotive*, and line 59, claim 25, after the word "wheel" insert the word *and;* and that the said Letters Patent should be read with these corrections therein that the same may conform to the record of the case in the Patent Office.

Signed and sealed this 31st day of October, A. D., 1922.

[SEAL.]
KARL FENNING,
*Acting Commissioner of Patents.*